United States Patent
Consoli

(10) Patent No.: US 9,555,819 B2
(45) Date of Patent: Jan. 31, 2017

(54) METHOD AND DEVICE FOR PROTECTION AGAINST GUIDING LOSS FOR A GUIDED VEHICLE

(71) Applicant: SIEMENS S.A.S., St. Denis (FR)

(72) Inventor: Luciano Consoli, Paris (FR)

(73) Assignee: SIEMENS S.A.S., ST. Denis (FR)

( * ) Notice: Subject to any disclaimer, the term of this patent is extended or adjusted under 35 U.S.C. 154(b) by 188 days.

(21) Appl. No.: 14/397,028

(22) PCT Filed: Apr. 30, 2013

(86) PCT No.: PCT/EP2013/058952
§ 371 (c)(1),
(2) Date: Oct. 24, 2014

(87) PCT Pub. No.: WO2013/189651
PCT Pub. Date: Dec. 27, 2013

(65) Prior Publication Data
US 2015/0107483 A1    Apr. 23, 2015

(30) Foreign Application Priority Data
Jun. 20, 2012 (EP) .................................... 12290202

(51) Int. Cl.
*B61F 9/00* (2006.01)
*B62D 1/26* (2006.01)
(Continued)

(52) U.S. Cl.
CPC ................ *B61F 9/00* (2013.01); *B62D 1/265* (2013.01); *B66C 9/08* (2013.01); *B66C 9/16* (2013.01); *E01B 25/28* (2013.01)

(58) Field of Classification Search
CPC .............. B61F 9/00; B62D 1/265; B66C 9/08; B66C 9/16; E01B 25/28
See application file for complete search history.

(56) References Cited

U.S. PATENT DOCUMENTS 5,704,295 A * 1/1998 Lohr ...................... B62D 1/265
104/243
5,960,717 A * 10/1999 Andre ...................... B60L 5/40
104/139

(Continued)

FOREIGN PATENT DOCUMENTS

| CN | 1241234 A | 1/2000 |
| CN | 1247511 A | 3/2000 |

(Continued)

*Primary Examiner* — Jason C Smith
(74) *Attorney, Agent, or Firm* — Laurence Greenberg; Werner Stemer; Ralph Locher

(57) ABSTRACT

A guided vehicle includes a guidance unit having first and second V-mounted guide pulleys resting on first and second running surfaces of a guide rail. The running surfaces are on sides of a median longitudinal plane of the guide rail and each pulley has a flange for freely gripping the guide rail. A device and method protecting against loss of vehicle guidance include a section with longitudinal height fixed along its length to a guide rail part, between running surfaces, the section having a cross-section guiding the unit during derailment or loss of guidance thereof with the section fixed to the guide rail part. The cross-section geometry holds the first pulley flange on the side of the median plane including the first pulley running surface and the second pulley flange on the side including the second pulley running surface. A device fixes the section to the guide rail.

15 Claims, 4 Drawing Sheets

(51) Int. Cl.
*E01B 25/28* (2006.01)
*B66C 9/08* (2006.01)
*B66C 9/16* (2006.01)

(56) References Cited

U.S. PATENT DOCUMENTS

| | | | | |
|---|---|---|---|---|
| 6,029,579 | A * | 2/2000 | Andre | B62D 1/265 104/243 |
| 6,253,685 | B1 * | 7/2001 | Lohr | E01B 25/28 104/244 |
| 6,363,860 | B1 * | 4/2002 | Andre | B62D 1/265 104/243 |
| 7,228,803 | B2 | 6/2007 | Andre et al. | |
| 2005/0172851 | A1 * | 8/2005 | Andre | B61F 9/00 104/244 |
| 2010/0065692 | A1 * | 3/2010 | Andre | B62D 1/265 246/121 |
| 2010/0071582 | A1 * | 3/2010 | Andre | B62D 1/265 104/244 |
| 2012/0126066 | A1 * | 5/2012 | Consoli | B61B 10/04 246/170 |
| 2014/0306068 | A1 * | 10/2014 | Andre | B61K 9/00 246/170 |
| 2014/0331887 | A1 * | 11/2014 | Andre | B61F 9/00 104/246 |
| 2015/0033976 | A1 * | 2/2015 | Carpentier | E01B 5/18 104/242 |
| 2015/0107483 | A1 * | 4/2015 | Consoli | B62D 1/265 104/242 |
| 2016/0167685 | A1 * | 6/2016 | Consoli | B61F 9/005 246/170 |

FOREIGN PATENT DOCUMENTS

| | | |
|---|---|---|
| CN | 1306483 A | 8/2001 |
| CN | 1942359 A | 4/2007 |
| FR | 2757549 A1 | 6/1998 |
| FR | 2780739 A1 | 1/2000 |

* cited by examiner

METHOD AND DEVICE FOR PROTECTION AGAINST GUIDING LOSS FOR A GUIDED VEHICLE

BACKGROUND OF THE INVENTION

Field of the Invention

The present invention relates to a method and devices to protect against a loss of guidance of a guided vehicle during a derailment and/or failure of guidance of said guided vehicle.

"Guided vehicle" refers to means of public transport such as buses, trolley buses, trams, metros, trains or train units, etc., but also to means of transporting loads such as, for example, traveling cranes, for which the safety aspect is very important and for which guidance is provided in particular by a single rail placed on a track and commonly called a "guide rail". The guide rail acts as a guide for a guidance unit which is generally supported on said guide rail and follows its trajectory when the guided vehicle is moving. The guidance unit enables for example a guidance system to direct a steering axle of the vehicle along the trajectory defined by the guide rail so that said vehicle does not leave its track, said axle being for example fitted with bogie wheels.

The guidance unit generally includes a pair of guide wheels, also called guide pulleys, mounted in a V and fitted with flanges making it possible to grip the guide rail. Such a guidance unit is for example described in documents U.S. Pat. Nos. 7,228,803 B2, US 6,029,579 A1, US 6,363,860 B1. Vehicles guided by this type of guidance unit operate in accordance with the following general principle, described by reference to FIG. 1: said guidance unit follows the guide rail 3 by means of the pair of pulleys 1, 2 in contact with the guide rail 3 and gives the guidance system a direction to be imposed on a steering axle of the vehicle. A conventional guide rail 3 is in particular made of a base plate 4 fixed to the ground 5 and a core 6 supporting a head 7 on which the pulleys 1, 2 are supported via a tread 9. Each of the pulleys 1, 2 in the same pair of guide pulleys thus has its tread 9 in contact with a surface of the head 7, called the running surface 8, and distributed symmetrically on each side of the upper part of the head 7. When the vehicle is moving, the pulleys 1, 2 are in contact with the head 7, and their respective flanges 10 encircle, without contact in nominal mode, the latter and come closer to the core 6 below it. Since the distance between the lower ends 201, 101 of the two flanges 10 encircling the head 7 is less than the width C of the head 7, extraction of the head 7 out of the grip of said pulleys 1, 2, or even out of the zone included between the treads 9 and the flanges 10, is only possible if the angle 11 at which the pulleys are fixed, i.e. the angle corresponding to the sector formed by the axes of rotation of each of the pulleys 1, 2 of a pair of pulleys and cut by the plane of symmetry of the pair of pulleys in a V, increases and/or if the flanges 10 and/or the outer edges of the head 7 are deformed.

The correct orientation of the vehicle is thus obtained by coupling the pair of pulleys of the guidance unit of the guidance system with the steering axle of the vehicle. If the pulleys are correctly gripping the guide rail, the vehicle follows the trajectory described by the rail when it is moving. On the other hand, if the pulleys leave their normal operating position, for example, if the head of the guide rail leaves the zone included between the treads and the flanges, then the vehicle risks leaving the trajectory initially established by the rail. In fact, as soon as the pulleys are no longer restricted to the direction imposed by the guide rail, they can depart towards the right or left of the rail, thus deflecting the vehicle from the planned trajectory. The scenario in question is defined as a loss of guidance or simply failure of guidance of the vehicle. In other words, the correct positioning of the pulleys is a necessary condition to guarantee the correct direction of the vehicle.

Although improbable, extraction of the head out of the grip of the pulleys is possible. This is the case for example when a vertical pulling effort directed upwards is applied to the pulleys or on a fixing base for pulleys so that deformation of the parts (flange and/or head and/or pulley axis) means that the distance between the flanges exceeds the width of the head. In this case, the pulleys no longer grip the guide rail and can be positioned either alongside it, as shown in FIG. 2, or on top of the guide rail, as illustrated by FIG. 3. The references used in FIG. 1 are also used for FIGS. 2 and 3. When positioned on top of the guide rail, the vehicle can still be guided even if the guidance unit is no longer encircling the guide rail. On the other hand, if the guide pulleys are positioned alongside the guide rail, deflection of the bogie wheels may cause the guided vehicle to leave its initially planned trajectory, which could have disastrous consequences for the operation of the vehicle and the network to which it belongs, and for the safety of the passengers and staff on board.

BRIEF SUMMARY OF THE INVENTION

Thus, the current guidance systems for guided vehicles do not make it possible to ensure maintenance of the trajectory of said guided vehicle in the event of derailment. An object of the present invention is to propose a simple, safe, reliable and economically advantageous device to protect against a loss of guidance of a guided vehicle during a derailment, which is capable of maintaining the guidance of said guided vehicle over all of a track layout followed by the guided vehicle, in particular both in a track intersection zone and on a standard track. The object of the present invention is also rapidly and reliably to prevent the guidance system of a guided vehicle being able to retain its ability to deflect by means of driving rods in the event of loss of guidance and/or derailment.

In order to achieve these objectives, a method and devices are proposed according to the invention.

A set of sub-claims also presents advantages of the invention.

The present invention relates to a device to protect against a loss of guidance of a guided vehicle equipped with a guidance unit including a pair of guide pulleys mounted in a V, respectively a first pulley and a second pulley, intended to rest respectively on a first and second running surface of a guide rail intended to guide said guided vehicle, said first and said second running surface being positioned on each side of a median longitudinal plane of said guide rail, in particular on the head of said guide rail, each of the pulleys being provided with a flange, said flanges making it possible freely to grip the guide rail, in particular its head, said protection device including:

a section with height h>0 extending longitudinally, configured to be fixed along its length to at least a part of said guide rail, between said first and said second running surface, said section having a cross-section, and in particular mechanical characteristics suitable for guiding the guidance unit during a derailment or loss of guidance of said guidance unit when said section is fixed to said part of the guide rail, said cross-section having a geometry capable of holding the flange of the first pulley on the side of the median plane comprising the running surface of said first pulley and the flange of the second pulley on the side of the median plane comprising the running surface of said second pulley during a derailment or a loss of guidance of said guided vehicle, in particular by causing the flange of one or other of said pulleys to rest on the guide rail against a third or respectively fourth running surface positioned respectively on each side of said median plane, i.e. on each side of said section, and each delimited by one side of said section when said section is fixed to said part of the guide rail;

a means of fixing, for example by a system of bolts or by means of welds, said section on said guide rail, in particular on the head of said guide rail.

The present invention also relates to a guide rail suitable for the guidance of a guided vehicle equipped with a guidance unit including a pair of guide pulleys mounted in a V, respectively a first pulley and a second pulley, intended to rest respectively on a first and a second running surface of said guide rail, said first and said second running surface being positioned on each side of a median longitudinal plane of said guide rail, in particular on the head of said guide rail, each of the pulleys being provided with a flange, said flanges making it possible freely to grip the guide rail, in particular its head, said guide rail being characterized in that it includes, between said first and said second running surface, in particular on an upper face of its head, a section with height h>0 extending longitudinally over said guide rail, in particular on its head, over at least part of said guide rail, said section being suitable for guidance of the guidance unit during a derailment or loss of guidance of said guidance unit, its cross-section having a geometry capable of causing the flange of the first pulley to remain on the side of the median plane comprising the running surface of said first pulley and the flange of the second pulley on the side of the median plane comprising the running surface of said second pulley, in particular during a derailment or a loss of guidance of said guided vehicle. In particular, the geometry of the cross-section of the section is capable of causing the flange of one or other of said pulleys to rest on the guide rail against a third or respectively fourth running surface positioned respectively on each side of said median plane, i.e. on each side of said section, and each delimited by one side of said section. For this purpose, a person skilled in the art would be able to size said section so that a flange of a pulley is in contact or otherwise with the rail during a derailment or a loss of guidance of said guided vehicle.

Finally, the present invention also relates to a method to protect against a loss of guidance of a guided vehicle equipped with a guidance unit including a pair of guide pulleys mounted in a V, respectively a first pulley and a second pulley, intended to rest respectively on a first and a second running surface of a guide rail used to guide said guided vehicle, said first and said second running surface being positioned on each side of a median longitudinal plane of said guide rail, in particular on the head of said guide rail, each of the pulleys being provided with a flange, said flanges making it possible freely to grip the guide rail, in particular its head, said protection method including a fixing, on said guide rail, between said first and said second running surface, in particular on the top of said head, of a section with height h>0 extending longitudinally over a part of said guide rail, said section being suitable for guiding the guidance unit during a derailment or loss of guidance of said guidance unit, while being capable of causing the flange of the first pulley to remain on the side of the median plane comprising the running surface of said first pulley and the flange of the second pulley on the side of the median plane comprising the running surface of said second pulley, in particular by causing the flange of one or other of said pulleys to rest on the guide rail against a third or respectively fourth running surface positioned respectively on each side of said median plane, i.e. on each side of said section, and each delimited by one side of said section.

Advantageously, the device to protect against a loss of guidance, the guide rail and the method to protect against a loss of guidance according to the invention make it possible to maintain the trajectory of said guided vehicle during a loss of guidance or a derailment by imposing on at least one of the flanges of the guidance unit, by means of said section, the trajectory described by the guide rail, for example until the guided vehicle stops, or even along the part of the guide rail including said section. Said section may in particular be fitted to a guide rail over all of its length, or only certain longitudinal parts of the guide rail, such as for example the parts of the guide rail located in zones of intersections of rails.

Preferably, for at least one end of said section, the height h of said section varies over a length X from a minimum value h≈0 at the end of said section to a nominal value h=h1 greater than said minimum value, such that, for a section with length L, its height increases from 0 to h1 over a length X<L at at least one of its ends, then is for example either maintained constant h=h1 or variable from X to L−X, and decreases from L−X to L passing from a height h=h1 to a height h≈0. Preferably, the height h1 of the section is typically of the order of 15 to 30 mm and the length X of the order of 50 to 100 cm.

Preferably, said section has a cross-section including a base intended to be fixed on said guide rail, two sides symmetrical with respect to said median plane and intended to cause the flange of one or other of said pulleys to rest on the guide rail and an upper side. In particular, said cross-section of said section is in the shape of an isosceles trapezium, the small base of said isosceles trapezium being intended to be fixed to said guide rail, and the non-parallel sides of said isosceles trapezium preferably having a shape curved towards the interior of said isosceles trapezium. Advantageously, such a cross-section provides for effectively maintaining the flanges resting on the guide rail.

Said section is in particular made of a material capable of mechanically withstanding the stresses produced by the flanges against said section during guidance of the guidance unit by said section. In particular, said section is made of steel or manufactured in the same way as said guide rail. Preferably, said section is welded to said guide rail or may include fixing holes making it capable of being fixed to the guide rail by means of a system of bolts. The guide rail according to the invention, fitted with said section, can in particular be directly produced by rolling.

DESCRIPTION OF THE INVENTION

Figure 1:
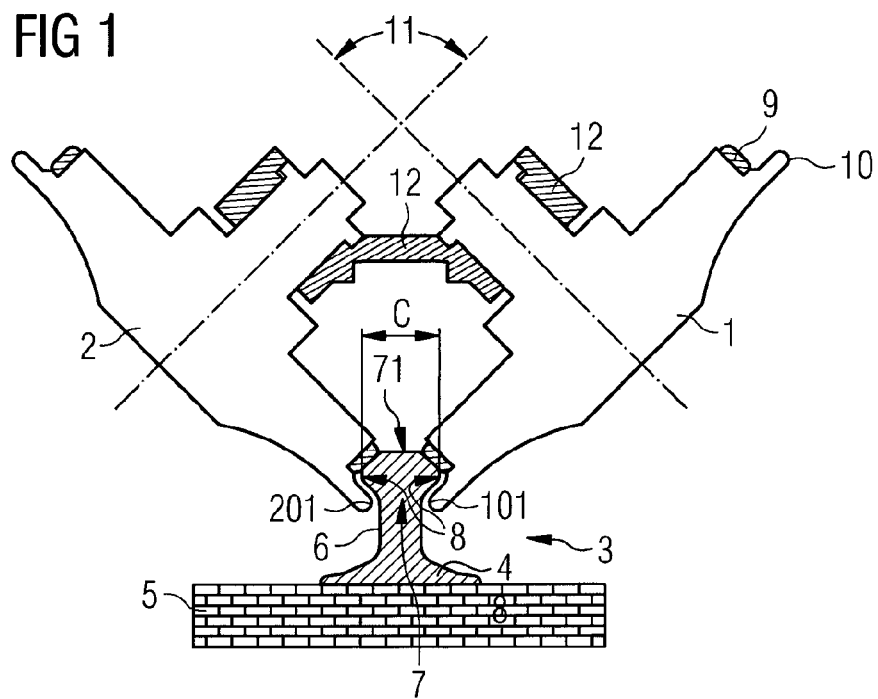
FIG. 1 pair of guide pulleys correctly rerailed in nominal mode on a guide rail.
Figure 2:
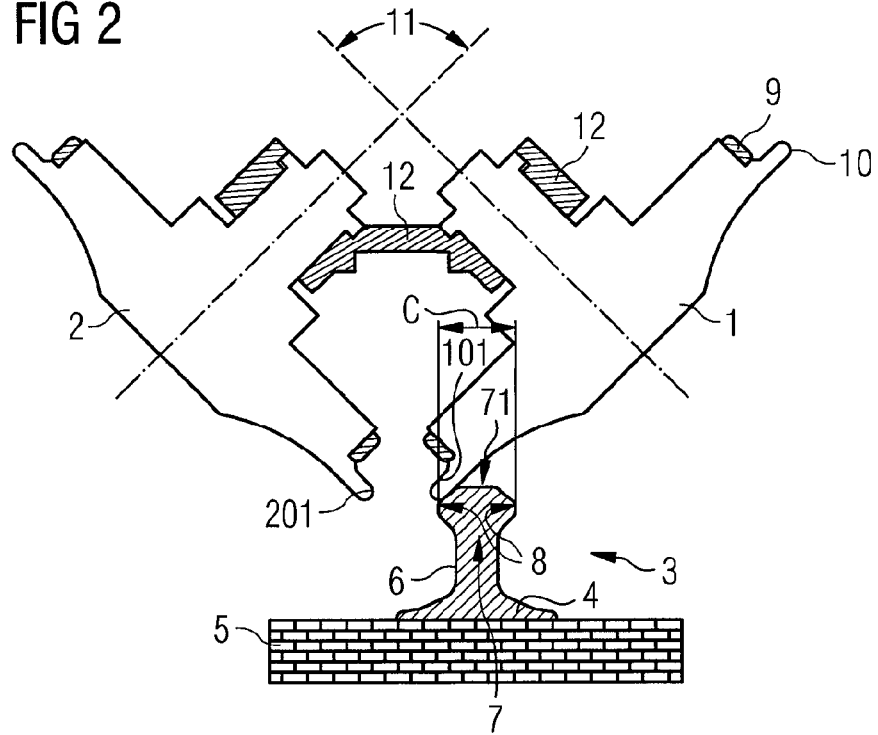
FIG. 2 positioning of a pair of guide pulleys alongside a guide rail during a derailment.
Figure 3:
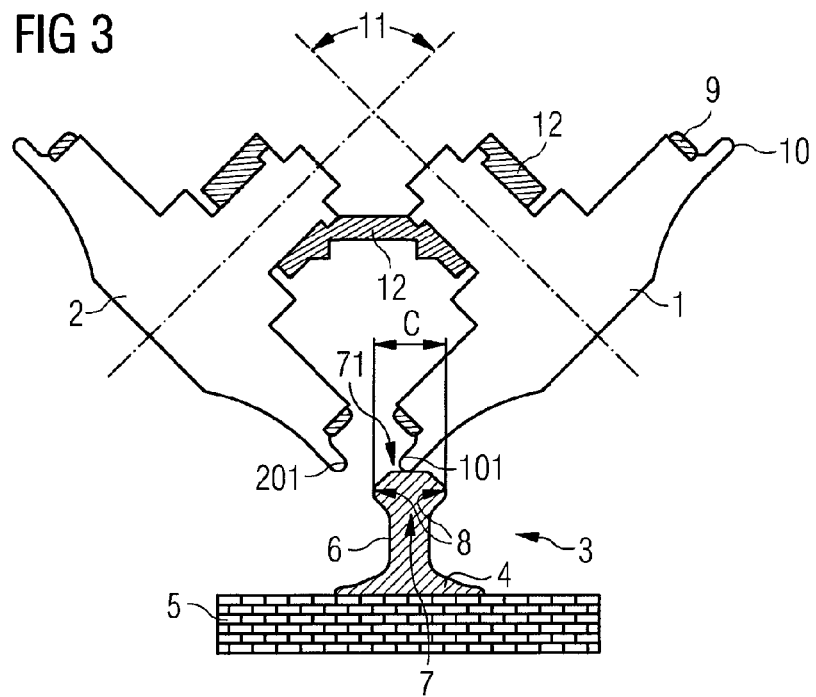
FIG. 3 positioning of a pair of guide pulleys on top of a guide rail during a derailment.

FIGS. 1 to 3 respectively present correct rerailing of a pair of pulleys 1, 2 on a conventional guide rail 3 representing the nominal mode of operation of the pair of pulleys 1, 2, a case of derailment of the pair of pulleys 1, 2 alongside said conventional guide rail 3, and a case of derailment of the pair of pulleys 1, 2 on top of the guide rail 3, each pulley being mounted on a fixing base 12 of the guidance unit. The derailment of the pair of pulleys 1, 2 alongside the guide rail 3 may lead to deflection of the guidance unit likely to result in a loss of trajectory for the guided vehicle.

Figure 4:
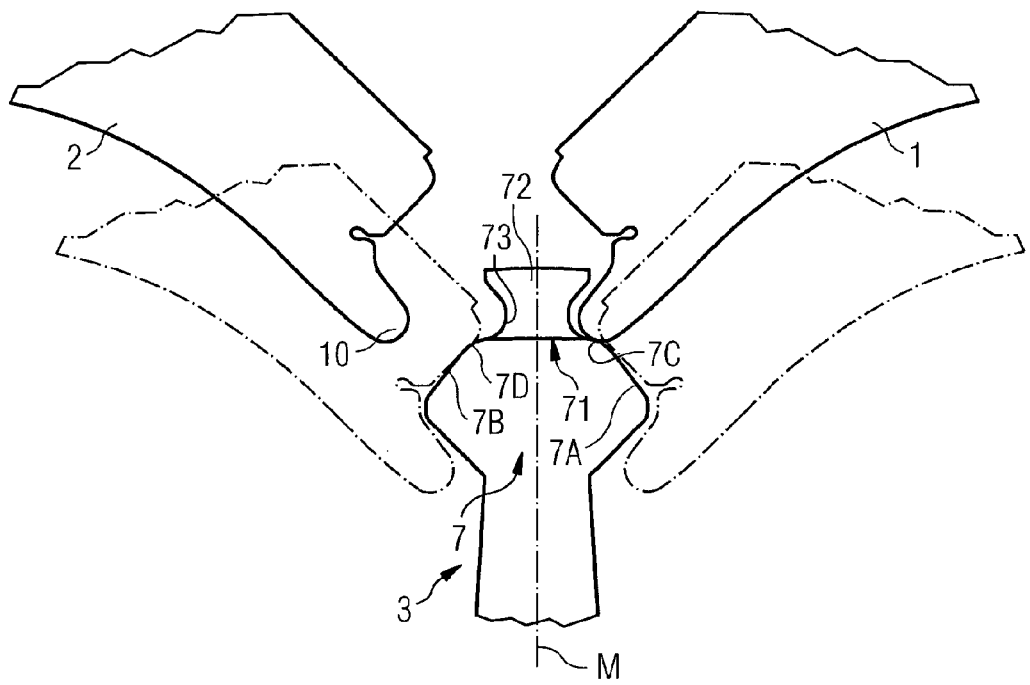
FIG. 4 example of a guide rail according to the invention—front view.

In order to avoid such a problem, the present invention proposes enhancing a guide rail 3 as described in FIGS. 1-3 by fitting it with a protection device according to the invention as presented in FIGS. 4 to 7. To this effect, the head 7 of the guide rail 3 in FIGS. 1-3 can in particular be fitted with a section 72 which can be fixed on an upper face 71 of said head 3 as illustrated in FIG. 4.

FIG. 4 presents an example of a guide rail 3 according to the invention. This guide rail 3 is suitable for the guidance of a guided vehicle fitted with a guidance unit including a pair of guide pulleys 1, 2, mounted in V, respectively a first pulley 1 and a second pulley 2, intended to rest respectively on a first running surface 7A and a second running surface 7B of said guide rail, said first and said second running surface 7A, 7B being positioned on each side of a median longitudinal plane M of said guide rail 3, and in particular on the head 7 of said guide rail 3, each of the pulleys 1, 2 being provided with a flange 10, said flanges 10 making it possible freely to grip the guide rail 3, in particular its head 7, when the pulleys 1, 2 are positioned in nominal mode, i.e. in correct rerailing mode as represented by dotted lines, said guide rail 3 being characterized in that it includes, between said first and said second running surface 7A, 7B, in particular on an upper face of its head 7, a section 72 with height h>0 extending longitudinally over said guide rail 3, in particular on its head 7, over at least a longitudinal part or portion of said guide rail 3, said section 72 being suitable for a guidance of the guidance unit during a derailment or loss of guidance of said guidance unit, presented in particular by the position of the pulleys 1, 2, in solid lines, its cross-section having a geometry capable of causing the flange 10 of the first pulley 1 to remain on the side of the median plane M including the running surface 7A of said first pulley 1 and the flange 10 of the second pulley 2 to remain on the side of the median plane M including the running surface 7B of said second pulley 2, for example by causing the flange 10 of one or other of said pulleys 1, 2 to rest on the guide rail 3 against a third running surface 7C or respectively a fourth running surface 7D positioned respectively on each side of said median plane M, i.e. on each side of said section 72, and each delimited by one side of said section 72.

Preferably, said section 72 can be fixed by means of welds 73 to said head 7 of said guide rail 3.

Figure 5:
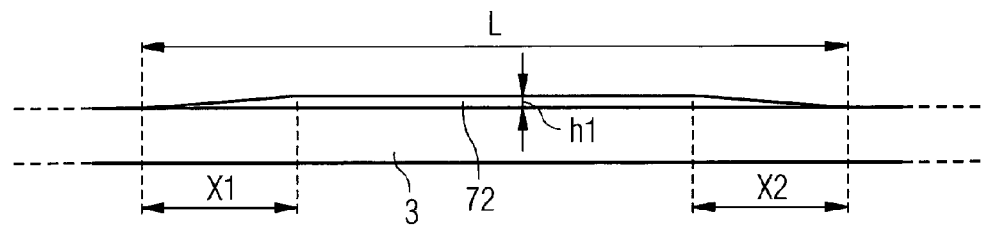
FIG. 5 example of a guide rail according to the invention—side view.

FIG. 5 presents a side view of a guide rail according to the invention. The guide rail 3 according to the invention includes, on an upper part of its head, said section 72. The latter is in particular characterized by a length L. The height h of said section is preferably maintained constant, $h \cong h1$, over a distance $L-(X1+X2)$ between the longitudinal ends of said section. In this way, for each longitudinal end of said section, the height h of said section can preferably vary on one side over a length $X=X1$ from a minimum value $h \cong 0$ to a nominal value $h=h1$ greater than said minimum value and, on the other side, over a length $X=X2$ from a minimum value $h \cong 0$ to the nominal value $h=h1$ greater than said minimum value, such that, for a section with length L, its height increases from 0 to h1 over the length X1, then is maintained constant, i.e. $h=h1$ from X1 to $L-X2$, and decreases from $h=h1$ to $h \cong 0$ from $L-X2$ to L.

Figure 6:
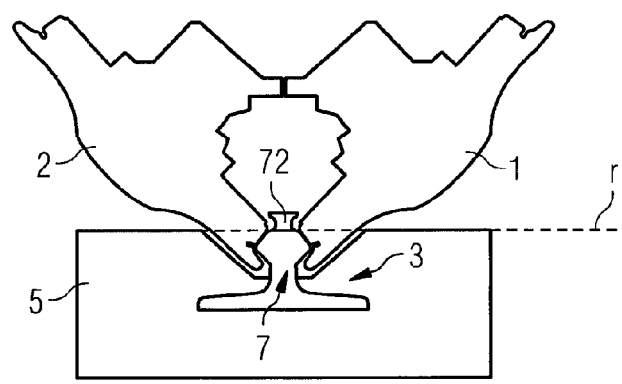
FIG. 6 example of positioning of a guide rail according to the invention with respect to the surface of a track.
Figure 7:
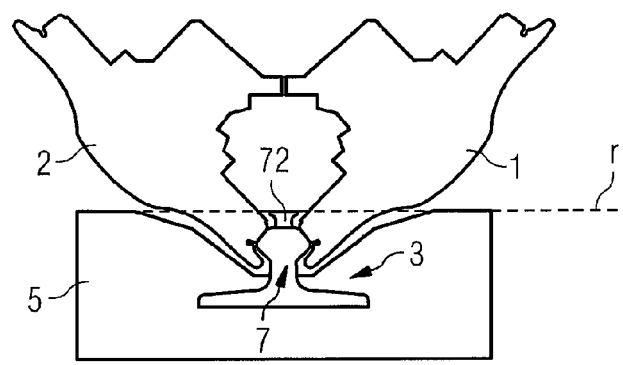
FIG. 7 another example of positioning of a guide rail according to the invention with respect to the surface of a track.

FIGS. 6 and 7 present two preferred alternatives for positioning of the guide rail 3 according to the invention with respect to the level r of the running surface of the guided vehicle. According to a first alternative presented in FIG. 6, the upper part of the head 7 of said guide rail 3 is at the same level r as the running surface of the guided vehicle and the section 72 according to the invention projects by its height h above said running surface, while, according to the second alternative presented in FIG. 7, the top of said section 72 is at the level r of said running surface. In each of the two alternatives, the base plate of the guide rail 3 can be fixed in a plinth 5 capable of encircling without contact the part of the pulleys 1, 2, encircling the guide rail 3.

Figure 8A:
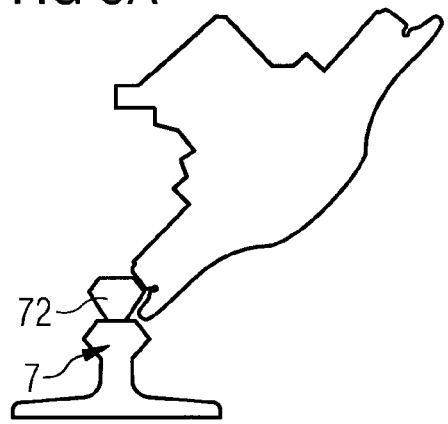
FIGS. 8A, 8B and 8C exemplary embodiments of a section according to the invention.
Figure 8B:
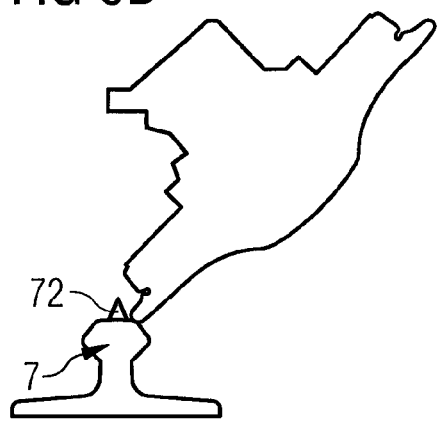
Figure 8C:
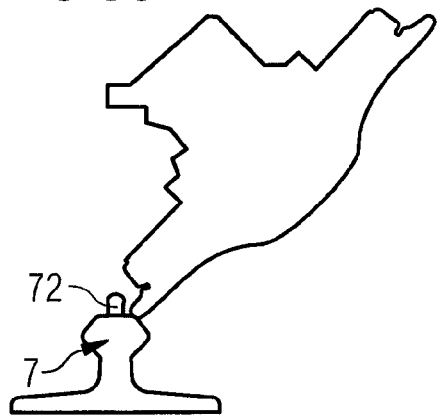

Finally, FIG. 8 presents preferred examples of a cross-section of said section 72 according to the invention intended to be fixed on the head 7 of a guide rail. FIG. 8A illustrates for example a section 72 the cross-section of which is of a shape and dimensions identical or close to the shape and dimensions of said head 7, such that, during a derailment or loss of guidance, the flange is not in contact with the head 7 of said guide rail. FIG. 8B presents for example a section 72 with a cross-section in the shape of an isosceles triangle the base of which is fixed on the upper part of said head 7 of the guide rail. FIG. 8C schematically illustrates a section 72 the cross-section of which is in particular quasi-rectangular in shape.

To sum up, the protection device, the guide rail and the method according to the invention present the following advantages:

a reduced number of components likely to cause a failure, implying in particular low development, manufacture, installation and maintenance cost;

resistance to the external restrictive environments associated with guided vehicles;

securing and maintaining the trajectory in the event of derailment of the guidance unit, whether on standard track or in an intersection zone;

they do not interfere with other protection systems or methods, which facilitates the redundant use of said other protection systems or methods with the present invention;

they do not require safety monitoring.

The invention claimed is:

1. In a guided vehicle equipped with a guidance unit including first and second guide pulleys mounted in a V and intended to rest on respective first and second running surfaces of a guide rail with the first and second running surfaces positioned on respective sides of a median longitudinal plane of the guide rail and each of the guide pulleys having a flange permitting free gripping of the guide rail, a device for protecting against a loss of guidance of the guided vehicle, said device comprising:

a section having a length, having a longitudinally-extending height (h>0) and being configured to be fixed along said length to at least a part of the guide rail between the first and said second running surfaces;

said section having a cross-section configured to guide the guidance unit during a derailment or loss of guidance of the guidance unit with said section fixed to the part of the guide rail;

said cross-section having a geometry configured to hold the flange of the first guide pulley on the side of the median plane having the running surface of the first guide pulley and configured to hold the flange of the second guide pulley on the side of the median plane having the running surface of the second guide pulley; and a device for fixing said section to the guide rail.

2. The protection device according to claim 1, wherein said section has ends, and at least one of said ends of said section has a height varying over a length from a minimum value ($h \approx 0$) at said one end of said section to a nominal value ($h = h1$) greater than said minimum value.

3. The protection device according to claim 1, wherein said cross-section of said section has a shape of an isosceles trapezium with a small base configured to be fixed to the guide rail.

4. In a guided vehicle equipped with a guidance unit including first and second guide pulleys mounted in a V and having respective flanges, a guide rail to be freely gripped by the flanges for guiding the guided vehicle, the guide rail comprising:

a median longitudinal plane;

first and second running surfaces each disposed on a respective side of said median longitudinal plane and each configured to support a respective one of the first and second guide pulleys; and a section configured to guide the guidance unit during a derailment or loss of guidance of the guidance unit, said section disposed between said first and second running surfaces, said section having a height extending longitudinally over the guide rail, and said section configured to hold the flange of the first guide pulley on a side of said median longitudinal plane having the running surface of the first guide pulley and configured to hold the flange of the second guide pulley on a side of the median longitudinal plane having the running surface of the second guide pulley.

5. The guide rail according to claim 4, which further comprises:

third and fourth running surfaces each disposed on a respective side of said median plane and each delimited by a respective side of said section;

said section having a cross-section with a geometry configured to cause the flange of one of said guide pulleys to rest on the guide rail against said third or fourth running surface.

6. The guide rail according to claim 4, wherein said section has longitudinal ends, and at least one of said longitudinal ends of said section has a height varying over a length from a minimum value at said one longitudinal end of said section to a nominal value greater than said minimum value.

7. The guide rail according to claim 6, wherein said section has a cross-section including a base configured to be fixed on the guide rail, two sides being symmetrical with respect to said median plane and configured to cause the flange of one of said guide pulleys to rest on the guide rail, and an upper side.

8. The guide rail according to claim 6, wherein said section has a cross-section with a shape of an isosceles trapezium and said isosceles trapezium has a small base configured to be fixed to the guide rail.

9. The guide rail according to claim 4, wherein said section is welded to the guide rail.

10. The guide rail according to claim 4, wherein said section has fixing holes configured to permit said section to be fixed to the guide rail by a system of bolts.

11. The guide rail according to claim 4, wherein the guide rail is a rolled part.

12. A method for protecting against a loss of guidance of a guided vehicle, the method comprising the following steps:

providing a guide rail having a median longitudinal plane and first and second running surfaces each disposed on a respective side of the median longitudinal plane;

providing a guided vehicle with a guidance unit including first and second guide pulleys mounted in a V, supporting each of the first and second guide pulleys on a respective one of the first and second running surfaces and providing each of the first and second guide pulleys with a respective flange configured to permit the guide rail to be freely gripped; and fixing a section on the guide rail between the first and the second running surfaces, providing the section with a height extending longitudinally over a part of the guide rail and using the section to:

guide the guidance unit during a derailment or loss of guidance of the guidance unit, hold the flange of the first guide pulley on a side of the median plane having the running surface of the first guide pulley, and hold the flange of the second guide pulley on the side of the median plane having the running surface of the second guide pulley.

13. The protection method according to claim 12, which further comprises fixing the section on the guide rail by welding.

14. The protection method according to claim 12, which further comprises fixing the section on the guide rail by using a system of bolts.

15. The protection method according to claim 12, wherein the guide rail has a part on which the section is fixed and the part belongs solely to a zone of intersection of guide rails.

* * * * *